United States Patent [19]

Chung et al.

[11] Patent Number: 4,677,148

[45] Date of Patent: Jun. 30, 1987

[54] THERMOPLASTIC COMPOSITIONS HAVING IMPROVED MECHANICAL PROPERTIES

[75] Inventors: James Y. J. Chung, Wexford; Dieter Neuray, Pittsburgh, both of Pa.

[73] Assignee: Mobay Corporation, Pittsburgh, Pa.

[21] Appl. No.: 786,933

[22] Filed: Oct. 11, 1985

Related U.S. Application Data

[63] Continuation-in-part of Ser. No. 593,001, Mar. 23, 1984, abandoned.

[51] Int. Cl.$^4$ .................... C08L 69/00; C08K 5/12
[52] U.S. Cl. ............................. 524/298; 524/296; 524/297; 524/504; 524/508; 524/537; 525/67; 525/69
[58] Field of Search ............... 525/67, 69; 524/296, 524/297, 298, 299, 508, 537, 504

[56] References Cited

U.S. PATENT DOCUMENTS

| | | | |
|---|---|---|---|
| 3,130,177 | 4/1964 | Grabowski | 260/45.5 |
| 3,864,428 | 2/1975 | Nakamura et al. | 260/873 |
| 4,212,791 | 7/1980 | Avery et al. | 260/40 |
| 4,223,125 | 9/1980 | Bier et al. | 528/305 |
| 4,226,950 | 10/1980 | Holub et al. | 525/67 |
| 4,257,937 | 3/1981 | Cohen et al. | 260/40 |
| 4,264,487 | 4/1981 | Fromuth et al. | 260/40 |
| 4,299,928 | 11/1981 | Witman | 525/67 |
| 4,352,904 | 10/1982 | Deyrup | 524/292 |
| 4,440,889 | 4/1984 | Hergenrother et al. | 524/143 |

FOREIGN PATENT DOCUMENTS 58-025352 2/1983 Japan.
1426524 3/1976 United Kingdom.

*Primary Examiner*—Theodore E. Pertilla
*Attorney, Agent, or Firm*—Gene Harsh; Joseph C. Gil; Aron Preis

[57] ABSTRACT

Thermoplastic molding compositions comprising a polycarbonate resin, a thermoplastic polyester and an impact modifier were found to maintain their impact performance, especially at low temperatures, while exhibiting a reduced melt viscosity upon the blending therewith a relatively small amount of a certain ester plasticizer.

12 Claims, No Drawings

THERMOPLASTIC COMPOSITIONS HAVING IMPROVED MECHANICAL PROPERTIES

This application is a continuation-in-part of application Ser. No. 593,001, filed Mar. 23, 1984, now abandoned.

FIELD OF THE INVENTION

The present invention relates to synthetic thermoplastic molding compositions and more particularly to molding compositions comprising a blend of polycarbonate resin, polyalkylene terephthalate and a rubber based impact-modifier.

SUMMARY OF THE INVENTION

Thermoplastic molding compositions comprising a polycarbonate resin, a thermoplastic polyester and an impact modifier were found to maintain their impact performance, especially at low temperatures, while exhibiting a reduced melt viscosity upon the blending therewith a relatively small amount of a certain ester plasticizer.

BACKGROUND OF THE INVENTION

A resin composition comprising a blend of an aromatic polycarbonate and an acrylate based impact modifier has been disclosed in U.S. Pat. No. 4,299,928. U.S. Pat. No. 3,130,177 disclosed blends of a polycarbonate and a graft copolymer of polybutadiene and a mixture of an alkenyl cyanide and a vinyl aromatic hydrocarbon, having improved thermoplastic properties.

U.S. Pat. No. 3,864,428 disclosed a composition comprising an aromatic polyester, an aromatic polycarbonate and a graft copolymer of a butadiene polymervinyl monomer.

U.S. Pat. No. 4,440,889 is considered to disclose polyethylene terephthalate based compositions containing a plasticizer selected from among a specific group of esters.

U.S. Pat. No. 4,257,937 disclosed a composition containing polyalkylene terephthalate, polycarbonate and a polyacrylate characterized in their improved impact resistance and resistance to heat distortion. Compositions containing an aromatic polyester, a polycarbonate resin, an impact modifier based on a crosslinked alkyl acrylate are described in U.S. Pat. No. 4,264,487; the use of plasticizers for their art recognized utility is also disclosed (column 3, line 39).

U.S. Pat. No. 4,352,904 is noted to disclose reinforced PET compositions containing monomeric or low molecular weight organic ester of aromatic carboxylic acids.

Patent Specification (U.K.) No. 1,426,524 discloses a process which promotes crystallization in polycarbonate resins consisting of incorporating in the polycarbonate a nucleating agent and a plasticizing agent. The preferred plasticizer is said to be an ester of benzenetricarboxylic acid, such as trimellitic acid.

U.S. Pat. No. 4,223,125 relates to polyalkylene terephthalates and discloses an aromatic acid ester in the context of rapidly crystallizing polyester compositions. Also, Japanese Pat. No. J58025-352 (dated Aug. 7, 1981) is indicated to describe a resin composition containing an aromatic polyester resin, a polycarbonate resin, an acrylic rubber and 0.01-5 parts by weight of an ester of $C_{14}$-$C_{20}$ aliphatic carboxylic acid and $C_{14}$-$C_{20}$ aliphatic alcohol; the composition is said to exhibit good impact resistance and improved mold release property. In accordance with the present invention, the addition of certain plasticizers to the composition of the invention imparts to the composition good moldability—low melt viscosity—without affecting its impact strength especially at low temperatures.

DETAILED DESCRIPTION OF THE INVENTION

The present invention relates to thermoplastic molding compositions comprising a resinous blend of an aromatic polycarbonate, a thermoplastic polyester and an impact-modifier, and is predicated on the surprising and unexpected combination of good mechanical properties and moldability which characterize the compositions resulting upon the addition of specific ester plasticizer thereto.

The polycarbonate resins useful in the practice of the invention are homopolycarbonate, copolycarbonate and terpolycarbonate resins or mixtures thereof. The polycarbonate resins generally have molecular weights of 10,000-20,000 (weight average molecular weight) preferably 20,000-80,000, and are alternatively characterized by their melt flow of 1-24 gm/10 min. at 300° C. per ASTM D-1238. These polycarbonates may be prepared, for example, by the known diphasic interface process from phosgene and dihydroxy compounds by polycondensation (See German DOS Nos. 2,063,050; 2,053,052; 1,570,703; 2,211,956; 2,211,957 and 2,248,817 and French Pat. No. 1,561,518 and the monograph, H. Schnell, *Chemistry and Physics of Polycarbonates*, Interscience Publishers, New York, 1964, all incorporated herein by reference).

In the present context, dihydroxy compounds suitable for the preparation of the polycarbonates of the present invention conform to the structural formulae (1) or (2)

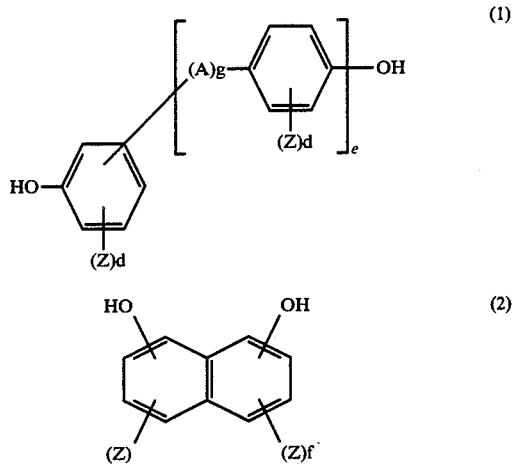

wherein
A denotes a bond or an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, an —SO— or —SO₂—radical or a radical of the general formula

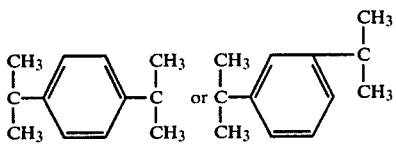

g denotes the number 0 or 1;

e denotes the number 0 or 1;

Z denotes F, Cl, Br or a $C_1$–$C_2$ alkyl and if several Z radicals are substituents in one aryl radical, their identity is independent of each other, d denotes 0 or an integer of from 1 to 4; and f denotes 0 or an integer of from 1 to 3.

Among the useful dihydroxy compounds in the practice of the invention are hydroquinone, resorcinol, bis-(hydroxyphenyl)-alkanes, bis-(hydroxyphenyl)-cycloalkanes, bis-(hydroxyphenyl)-ethers, bis-(hydroxyphenyl)-ketones, bis-(hydroxyphenyl)-sulfoxides, bis-(hydroxyphenyl)-sulfones and α,α-bis-(hydroxyphenyl)-diisopropyl-benzenes. These and further suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846 (all incorporated herein by reference), in German Offenlegungsschriften (German Published Specifications) Nos. 1,570,703; 2,063,050; 2,063,052; 2,211,956 and 2,211,957, in French Patent Specification No. 1,561,418 and in the monograph, H. Schnell, *Chemistry and Physics of Polycarbonates,* Interscience Publishers, New York, 1964. Further examples of suitable dihydroxy compounds are 2,2-bis-(4-hydroxyphenyl)-propane (bisphenol A), 2,4-bis-(hydroxyphenyl)-2-methyl-butane, 1,1-bis-(4-hydroxyphenyl)-cyclohexane, α,α-bis-(4-hydroxyphenyl)-p-diisopropyl-benzene, 2,2-bis-(3-chloro-4-hydroxyphenyl)-propane, hydroxybenzophenone and 4,4'-sulfonyl diphenol. The most preferred one is 2,2-bis-(4-hydroxyphenyl)-propane (bisphenol A).

The polycarbonates of the invention may entail in their structure, units derived from one or more of the suitable bisphenols.

The preparation of polycarbonate resins may be carried out in accordance with any of the processes known in the art, for example, by the interfacial polycondensation process, polycondensation in a homogeneous phase or by transesterification.

The suitable processes and the associated reactants, catalysts, solvents and conditions are known in the art and have been described, inter alia, in German Pat. Nos. 1,046,311 and 962,274 and in U.S. Pat. Nos. 3,248,414; 3,153,008; 3,215,668; 3,187,065; 3,028,365; 2,999,846; 2,999,835; 2,964,974; 2,970,137; 3,912,638 and 1,991,273.

In the preparation of the polycarbonate resins of the invention monofunctional reactants such as monophenols may be used in order to limit their respective molecular weights. Also, branching agents may be employed. Branching may be obtained by the incorporation of small amounts, preferably of between about 0.05 to 2.0 mol % (relative to diphenols employed), of trifunctional or more than trifunctional compounds, especially compounds having three or more phenolic hydroxyl groups. Polycarbonates of this type are described, for example, in German Offenlegungsschriften (German Published Specifications) Nos. 1.570,533; 1,596,762; 2,116,974 and 2,113,347; British Specification No. 1,079,821 and U.S. Pat. No. 3,544,514 (incorporated herein by reference).

Some examples of compounds with three or more than three phenolic hydroxyl groups which can be used are phloroglucinol, 4,6-dimethyl-2,4,6-tri-(4-hydroxyphenyl)-heptane, 2,4,6-trimethyl-2,4,6-tri-(4-hydroxyphenyl)-heptane, 1,4,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis-(4-hydroxyphenyl)-isopropyl)-phenol, 2,6-bis-(2-hydroxy-5'-methylbenzyl)-4-methylphenol, 2-(4-hydroxyphenyl)-2-(2,4-dihydroxyphenyl)-propane, hexa(4-(4-hydroxyphenylisopropyl)-phenyl)-ortho-terephthalic acid ester, tetra-(4-hydroxyphenyl)-methane, tetra-(4-(4-hydroxyphenylisopropyl)-phenoxy)-methane and 1,4-bis-(4',4"-dihydroxytriphenyl)-methyl) benzene. Some of the other trifunctional compounds are 2,4-dihydroxy-benzoic acid, trimesic acid, cyanuric chloride and 3,3-bis-(4-hydroxyphenyl)-2-oxo-2,3-hydroindole.

Among the resins suitable in the practice of the invention are included phenolphthalenic-based polycarbonate, copolycarbonates and terpolycarbonates such as are described in U.S. Pat. Nos. 3,036,036 and 4,210,741, both incorporated by reference herein.

Thermoplastic polyester resins in the present context are polymers or copolymers prepared by condensing primarily aromatic dicarboxylic acids (or an ester forming compound thereof) with a glycol (or with an ester forming compound thereof). Among the dicarboxylic acids which are suitable for preparing polyesters in accordance with the present invention are the aromatic dicarboxylic acids including for instance terephthalic acid, isophthalic acid, orthophthalic acid, 2,6-naphthalene dicarboxylic acid, 1,5-naphthalene dicarboxylic acid, as well as aliphatic dicarboxylic acids including for example adipic acid, sebacic acid, azelaic acid, cycloaliphatic dicarboxylic acids such as 1,3-cyclohexane dicarboxylic acids, 1,4-cyclohexane dicarboxylic acid and the like, or ester forming compounds thereof.

The glycols suitable for preparing the polyesters of the invention include for example aliphatic diols having 2 to 10 carbon atoms such as ethylene glycol, 1,3-propylene glycol, 1,4-butanediol, neopentyl glycol, 1,5-pentanediol, 1,6-hexanediol, decamethylene glycol, cyclohexanediol as well as long-chain glycols (MW up to about 6000) such as poly(tetramethylene glycol) and mixtures thereof.

The preferred polyester is polyethylene terephthalate.

The dicarboxylic acid component of the polyethylene terephthalate consists mainly of terephthalic acid and may contain up to 10 mol %, based on the total mols of acid of other aromatic dicarboxylic acids having from 6 to 14 carbon atoms, of aliphatic dicarboxylic acids having from 4 to 8 carbon atoms, of cycloaliphatic dicarboxylic acids having from 8 to 12 carbon atoms. Examples of such dicarboxylic acids which may be included with terephthalic acid are phthalic acid, isophthalic acid, naphthalene-2,6-dicarboxylic acid, diphenyl-4,4'-dicarboxylic acid, adipic acid, sebacic acid and cyclohexanediacetic acid.

The diol component of the polyethylene terephthalate consists mainly of ethylene glycol. It may, however, contain up to 10 mol % of aliphatic diols having from 3 to 12 carbon atoms, cycloaliphatic diols having from 6 to 15 carbon atoms or aromatic diols having from 6 to 21 carbon atoms. Examples of such additional diols ("codiols") include propane-1,3-diol, butane-1,4-diol, pentane-1,5-diol, hexane-1,6-diol or cyclohexane-1,4- dimethanol, 3-methyl-pentanediol-(2,4), 2-methylpentanediol-(1,4), 2,2,4-trimethylpentanediol-(1,3), 2,2-diethylpropanediol-(1,3), hexanediol-(1,3), 1,4-di(β-hydroxyethoxy)-benzene, 2,2-bis-(4-hydroxycyclohexyl)-propane, 2,4-dihydroxy-1,1,3,3-tetramethylcyclobutane, 2,2-bis-(3-β-hydroxyethoxyphenyl)-propane and 2,2-bis-(4-hydroxypropoxyphenyl)-propane.

The polyethylene terephthalates can be branched by incorporating relatively small amounts of trihydric or tetrahydric alcohols or tribasic or tetrabasic acids, as described in German Offenlegungsschrift No. 1,900,270 and in U.S. Pat. No. 3,692,744. Examples of suitable branching agents include trimesic acid, pyromellitic acid, trimethylolpropane and ethane and pentaerythritol. It is advisable not to use more than 1 mol % of branching agent based on the quantity of acid component.

Polyethylene terephthalates derived mainly from terephthalic acid and ethylene glycol are preferred and homopolyethylene terephthalate, i.e., a product produced substantially only from ethylene glycol and terephthalic acid or its esters, or its anhydride is more preferred.

The polyester resins of the composition in accordance with the invention are characterized in that their intrinsic viscosity (I.V.) is at least about 0.4 and preferably about 0.6 to about 1.6 dl/gm measured as a 1% solution in a 60:40 mixture of phenol and tetrachloroethane at 30° C. These resins are available commercially or can be prepared by known means such as by the alcoholysis of esters of terephthalic acid with ethylene glycol followed by polymerization, by heating the glycols with the free acids or with their halide derivative and similar processes such as are described among others in U.S. Pat. Nos. 2,465,319 and 3,047,539, both incorporated herein by reference.

The preferred thermoplastic polyester in the present context is polyethylene terephthalate, PET, such as is available under the designation Vituf 1001A or CFR 5041 from the Goodyear Tire & Rubber Company.

In the context of the invention, impact modifiers are rubbery compounds characterized in their rubber elastic properties in that their glass transition temperature is below 20° C., in their good compatibility with the thermoplastic polyester and polycarbonate blend wherein they are incorporated. Compatibility in the present sense is to be understood as the suitability of the impact modifier to form a substantially uniform distribution in the resinous blend of the polycarbonate and polyalkylene terephthalate. The term rubbery compounds in the present context is understood to include acrylate rubber and diene rubbers, i.e., homopolymers of conjugated dienes having 4 to 8 carbon atoms such as butadiene, isoprene, piperylene and chloroprene and copolymers of such dienes such as with acrylic or methacrylic acids or derivatives thereof (e.g., acrylonitrile, methacrylonitrile, acrylic acid, methacrylic acid, butyl acrylate and methyl methacrylate) or isobutylene. Butadiene, butadiene/methyl methacrylate, butadiene/butyl acrylate, ethylene/propylene/diene, polypentenamer, butadiene/acrylonitrile and acrylate rubbers are particularly preferred. In a particularly preferred embodiment, the rubbery phase is at least partially crosslinked.

The preferred rubbery compounds of the invention are graft copolymers obtained by polymerizing certain monomers in the presence of the rubber. The certain monomers are:

(1) styrene and its derivatives such as α-methylstyrene, α-chlorostyrene, p-chlorostyrene, 2,4-dichlorostyrene, p-methylstyrene, 3,4-dimethylstyrene, o- and p-divinyl benzene, p-methyl-α-methylstyrene and p-chloro-α-methylstyrene:

(2) acrylic and methacrylic acids as well as nitriles and esters based thereon, preferably alkyl esters such as acrylic and methacrylic acid, acrylonitrile, methacrylonitrile, methyl acrylate, ethyl acrylate, n-propyl and isopropyl acrylate, n-butyl and isobutyl acrylate, 2-ethylhexyl acrylate, methyl methacrylate, n-butyl and isobutyl methacrylate, cyclohexyl methacrylate and isobornyl methacrylate:

(3) maleic acid anhydride.

The graft copolymers may be obtained by polymerizing monomers from group (1) or group (2) or both groups (1) and (2) in the presence of the rubbers as mentioned above, optionally also with (3).

Particularly preferred groups of such graft polymers are obtained by polymerizing (a) styrene, α-methyl styrene or mixtures thereof; (b) 0–50% by weight (based on total monomers) of the above-mentioned styrene derivatives in the presence of butadiene, butadiene/styrene, butadiene/methyl methacrylate, butadiene/butyl acrylate, ethylene/propylene/diene, polypentanamer or butadiene/acrylonitrile rubbers (which may also contain in copolymerized form small amounts of other monomers).

The particular graft copolymer most preferred is ABS (acrylonitrile-butadiene-styrene) resin.

A yet additional preferred embodiment is represented by the use of a graft polyacrylic rubber which can be made following known procedures and which is available from a number of sources, e.g., Rohm & Haas Company, Philadelphia, U.S.A. under the trade designations Acryloid KM 330 and 7709XP. Other useful polyacrylates are available from Goodyear Tire & Rubber Company, Akron, Ohio, U.S.A. under the trade designation RXL 6886; from American Cyanamid Company, Stamford, Conn., U.S.A. under the trade designation Cyanacryl 770; from M&T Chemicals Company, Trenton, N.J., U.S.A. under the trade designation Durastrength 2000; and from Polysar Corporation, Canada, under the trade designation Polysar S1006. In general, any of the polyalkyl acrylates described in U.S. Pat. No. 3,591,659, incorporated by reference herein, can be used, especially those containing units derived from n-butyl acrylate. Preferably, the polyacrylate resin will be in the form of a rubber-elastic graft copolymer having a glass transition temperature below 20° C. as described in Schlichting et al U.S. Pat. No. 4,022,748 incorporated herein by reference. Especially preferred among the acrylate based systems are the ones which are described in detail in U.S. Pat. Nos. 3,808,180 and 4,096,202, both incorporated herein by reference. Briefly, the technology described in U.S. Pat. No. 4,096,202 is that of the preparation of a specific class of multi-phase compounds. These are compositions comprising about 25 to 95% by weight of a first elastomeric phase and about 75 to 5% by weight of a second, rigid, thermoplastic phase. The first phase is polymerized from about 75 to 99.8% by weight $C_1$ to $C_6$ acrylate resulting in an acrylic rubber core having a glass transition temperature below about 10° C. which is crosslinked with 0.1 to 5% by weight of a crosslinking monomer and to which is added 0.1 to 5% by weight of a graft-linking monomer.

The preferred alkyl acrylate is butyl acrylate. The crosslinking monomer is a polyethylenically unsaturated monomer having a plurality of addition polymerizable reactive groups all of which polymerize at substantially the same rate of reaction. Suitable crosslinking monomers include polyacrylic and polymethacrylic esters of polyols such as butylene diacrylate and dimethacrylate, trimethylol propane trimethacrylate and the like; di- and trivinyl benzene, vinyl acrylate and methacrylate, and the like. The preferred crosslinking monomer is butylene diacrylate. The graft-linking monomer is a polyethylenically unsaturated monomer having a plurality of addition polymerizable reactive groups, at least one of which polymerizing at a substantially different rate of polymerization from at least one other of said reactive groups. The function of the graft-linking monomer is to provide a residual level of unsaturation in the elastomeric phase, particularly in the latter stages of polymerization and consequently at or near the surface of the elastomer particles. The preferred graft-linking monomer is allyl methacrylate or diallyl maleate.

The final stage monomer system can be comprised of alkyl methacrylate (preferably $C_1$-$C_6$ methacrylate) styrene, acrylonitrile, alkyl acrylates, dialkyl methacrylate and the like, as long as its Tg is at least 20° C. Preferably, the final stage monomer system is at least 50 wt % $C_1$ to $C_4$ alkyl methacrylate. It is further preferred that the final stage polymer be free of units which tend to degrade poly(alkylene terephthalate); for example, acid, hydroxyl amino and amide groups.

A certain such acrylic rubber interpolymer composite characterized in that acrylic rubber core is comprised of n-butyl acrylate and in that its crosslinking agent is 1,3-butylene diacrylate and in which the graft-linking agent is diallyl maleate and the second phase monomeric system of which is methyl methacrylate, said components relating by weight to 79.2/0.4/0.4/20.0, is available in commerce as Acryloid KM330.

The ester plasticizer in the context of the present invention is preferably an acid ester formed by esterification or by transesterification of a suitable aromatic acid, its anhydride and/or its dialkyl esters with a suitable alcohol. The suitable acid is a $C_6$-$C_{25}$, preferably $C_7$-$C_{25}$ carboxylic acid. The suitable alcohol is a $C_1$-$C_{20}$, preferably $C_4$-$C_{14}$, aliphatic or araliphatic alcohol, most preferably $C_8$-$C_{14}$ primary alcohols. A detailed description of the various methods for the preparation of ester plasticizers suitable in the present context may be found in E. Muller, "Methoden der Organischen Chemie" (Houben-Weyl), Vol. 14/2, page 1 et seq., George Thieme Verlag, Stuttgart 1963 and in V. V. Korshak and S. V. Vinogradove, "Polyesters", Pergamon Press, Oxford, 1965, pages 34–63.

The preferred suitable acids are those in which at least one carboxyl group is directly attached to a carbon atom of an aromatic ring. Included are the phenyl based acids such as benzoic, phthalic, isophthalic, terephthalic and trimellitic acids, the diphenyl based acids such as diphenyl dicarboxylic acid and diphenyl sulfone dicarboxylic acid and the fused ring acids such as the naphthalenic acids like 2,6-naphthalene dicarboxylic acid. Acids of the phthalate and of the trimellitic families are preferred, i.e., di- and tri-benzoic acids and phthalic and trimellitic acid are particularly preferred.

Among the suitable alcohols are those in which at least one hydroxy group is bound to an aliphatically bound carbon atom, including methanol, octylbenzylalcohol, butyl alcohol, isobutyl alcohol, 2-ethylhexanol, isononylalcohol, n-octylalcohol, iso-octylalcohols, n-decyl-alcohol, iso-decylalcohol, butoxyethyl alcohol, n-hexylalcohol, tetrahydrofurfurylalcohol, 2-butoxyethyl alcohol, ethyl alcohol, amyl alcohol, n-undecylalcohol, tridecyl alcohol, butylbenzyl alcohol, methoxy ethyl alcohol, benzyl alcohol, allyl alcohol and hydroabietyl alcohol. Also included are ethylene glycol, propane diol, 1,3/1,2, butanediol, 1,3/1,4, pentane diol 1,5, hexane diol 1,6, dipropylene glycol 1,3/1,2, diethylene glycol, triethylene glycol, tetraethylene glycol, polyethylene glycol, neopentyl glycol, glycerol, trimethylolethane, trimethylolpropane, pentaerythritol, 2,2,4-trimethyl-1,3-pentanediol and sucrose.

The ester plasticizers in the context of the present invention may be either monomeric or oligomeric in which case their number average molecular weight should be at most 5000, preferably no more than 3000.

The resinous compositions in the present context comprises (i) a polycarbonate resin, (ii) thermoplastic polyester and (iii) an impact modifier. The relative amounts of these components, stated in % by weight relative to the weight of the resinous composition is 15–85% of polycarbonate resin, 15–85% of thermoplastic polyester and 5–30% of the impact modifier, the corresponding preferred ranges are about 20–50, 40–80 and 10–25% by weight.

In accordance with the present invention the ester plasticizer is added to the resinous composition at a level of about 0.1 to about 5.0 parts of ester plasticizer per 100 parts, by weight—phr—of the resinous composition, a preferred range of plasticizer addition is about 0.1 to about 3.0 phr. The compositions of the invention are characterized in that they combine a good resistance to impact with good moldability as compared to prior art compositions containing prior art ester plasticizers or having no ester plasticizer addition at all.

The preparation of the resinous compositions of the invention follows procedures well known in the art for uniformly mixing resinous components. The use of a Banbury mixer, a hot roll or an extruder for the purpose is suitable. The method of blending is not critical in the present context. It was found useful however to blend the components simultaneously.

The compositions may further contain any of the various additives such as are customarily used in the art to obtain special properties such as stabilizers, mold release agents, flame retardants, nucleating agents, fillers, blowing agents and reinforcements.

The invention is further illustrated, but is not intended to be limited by the following examples in which all parts and percentages are by weight unless otherwise specified.

EXAMPLES

Thermoplastic molding compositions in accordance with the present invention were prepared and their properties determined. The processing of the composition was in accordance with a procedure well known in the art for blending extrusion and injection molding of polycarbonate/polyester blend. The extrusion was carried out in a 1½" Hartig Extruder at set temperature (°F.): rear zone 500, middle zone 500, front zone 500 and die 460; screw speed 90 rpm, screw set 64, screen pack 20/40/60/20.

Injection molding was carried out using a 4 oz. Newbury, zone set temperature (°C.): rear zone 260, front 260, nozzle 254, mold 90; cycle time (seconds): injection 12, cooling 25, total 37; injection pressure (psi): initial 800, secondary 750.

Table 1 below represents a comparison between compositions within the scope of the present invention (Examples 1, 2 and 3) and a prior art composition—control—similar thereto in all respects except for the exclusion of the ester plasticizer of the invention therefrom. In preparing the compositions, the resinous blend consisted of: 51% polyethylene terephthalate—PET—(-Vituf 1001A from Goodyear Tire & Rubber Company; characterized in that its intrinsic viscosity is 1.04), 34 polycarbonate homopolymer based on bisphenol A (Merlon M50 from Mobay Chemical Corporation), characterized in that its melt flow rate in accordance with ASTM D1238 (300° C.-1200g load) is about 3.0-5.0 gm/10 min. and 15% ABS resin characterized in that it contains 75 wt % polybutadiene grafted with 25% SAN (styrene/acrylonitrile weight ratio about 72/28) available from Bayer AG. In addition to the indicated components, the compositions also contained small amounts of the following additives, none of which is believed critical to the invention: talc as a nucleating agent, carbon black as pigment, a phosphite stabilizer and an antioxidant. The ester plasticizers used in Examples 1, 2 and 3 were linear trimellitate (based on a mixture of n-hexyl, n-octyl and n-decyl alcohols), trioctyl trimellitate and triisooctyl trimellitate, respectively, all are commercial products available for instance from C.P. Hall Co., and in each case they were added at a level of 2 phr.

TABLE 1

| Plasticizer | Control — | 1 LTM[(1)] | 2 TOTM[(2)] | 3 TIOTM[(3)] |
|---|---|---|---|---|
| Melt Viscosity (Pa.s., 270°) | | | | |
| @ 14.2 sec$^{-1}$ | 3226[(5)] | 2460 | — | 2150 |
| @ 1418 sec$^{-1}$ | 413 | 318 | — | 351 |
| Impact strength Notched Izod ⅛", J/m | | | | |
| @ 23° C. | 1008 | 957 | 868 | 965 |
| @ −30° C.[(4)] | 774 | 780 | 759 | 810 |
| @ −40° C.[(4)] | 754 | 730 | 707 | 752 |
| Tensile strength, mPa | | | | |
| at yield | 48.0 | 48.2 | 49.6 | 50.1 |
| at break | 49.1 | 50.6 | 50.2 | 52.2 |
| Tensile Elongation (%) | 163 | 161 | 163 | 166 |

[(1)]linear trimellitate.
[(2)]trioctyl trimellitate.
[(3)]triisoctyl trimellitate.
[(4)]dry ice/methanol bath.
[(5)]the melt viscosity of the control sample is somewhat depressed, believed to be due to the hydrolysis of the thermal stabilizer.

The results clearly demonstrate the efficacy of the plasticizer of the invention in improving the moldability of the composition while substantially retaining their impact performance especially at the low temperatures. In comparison to other ester plasticizers based on aliphatic acids reported in the prior art, the performance of the compositions of the invention are indeed surprising—see Table 2. The compositions of Table 2 were prepared following substantially the same procedure as described above for the preparation of the compositions of the invention.

TABLE 2

| Plasticizer[1] | Control — | 1 a | 2 b | 3 c | 4 d | 5 e |
|---|---|---|---|---|---|---|
| Melt Viscosity | 4612 | 3577 | 3309 | 2895 | 3205 | 3000 |
| | 491 | 385 | 343 | 323 | 358 | 376 |
| Impact strength Notched Izod ⅛", J/m | | | | | | |
| @ 23° C. | 1012 | 1170 | 1239 | 1132 | 1114 | 1040 |
| @ −30° C. | 705 | 183 | 198 | 231 | 501 | 322 |
| @ −40° C. | 721 | 204 | 232 | — | — | 380 |
| Tensile strength, mPa | | | | | | |
| at yield | 49.3 | 50.2 | — | 50.3 | 49.7 | — |
| at break | 51.0 | 49.8 | — | 47.9 | 46.6 | — |
| Tensile Elongation (%) | 156 | 196 | — | 215 | 188 | — | a polyhexane diol adipate (MW~2000)
b 1,6-hexanediol adipate (MW~840)
c 1,6-hexanediol neopentyl glycol adipate (MW~1700)
d 1,4-butanediol adipate (MW~2000)
e dicyclohexyl phthalate
[1]added at a level of 2 phr Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising a blend of
   (a) 15-85% of an aromatic polycarbonate resin having a melt flow of 1-24 grams/10 minutes at 300° C. per ASTM D-1238,
   (b) 15-85% of a thermoplastic polyester resin having an intrinsic viscosity of at least about 0.4 as measured as a 1% solution in a 60:40 mixture of phenol and tetrachloroethane at 30° C.,
   (c) 5-30% of an impact modifier selected from the group consisting of butadiene and acrylate based rubber grafts which is characterized in having a glass transition temeprature below 20° C.,
   said percents being relative to the weight of said blend and 0.1 to 5.0 phr of a monomeric or an oligomeric ester plasticizer which is derived from a $C_6$-$C_{25}$ aromatic carboxylic acid and a $C_1$-$C_{20}$ aliphatic or aralphatic alcohol characterized in that its number average moelcular weight is at most 5,000, said phr being in relation to the weight of the blend.

2. The composition of claim 1 wherein said blend comprises about 20-50% of said aromatic polycarbonate resin, about 40-80% of said thermoplastic polyester present and about 10-25% of said impact modifier.

3. The composition of claim 1 wherein said ester plasticizer is present at an amount of about 0.5 to about 3.0 phr.

4. The composition of claim 2 wherein said ester plasticizer is present at an amount of about 0.5 to about 3.0 phr.

5. The composition of claim 1 wherein said acid is selected from a group consisting of phthalic acid, benzoic acid and trimellitic acid.

6. The composition of claim 1 wherein said ester plasticizer is monomeric.

7. The composition of claim 1 wherein said ester is an oligomeric compound having a number average molecular weight of less than 3,000.

8. The composition of claim 1 wherein said polyester is polyethylene terephthalate.

9. The composition of claim 1 wherein said polycarbonate is a homopolycarbonate based on bisphenol A.

10. The composition of claim 1 wherein said impact modifier is an ABS graft.

11. The composition of claim 1 wherein said impact modifier is based on an acrylate rubber.

12. A thermoplastic molding composition comprising a blend of
   (a) 15-85% of an aromatic polycarbonate resin having a melt flow of 1-25 grams/10 minutes at 300° C. per ASTM D-1238,
   (b) 15-85% of a thermoplastic polyester resin having an intrinisc viscosity of at least about 0.4 as measured as a 1% solution in a 60:40 mixture of phenol and tetrachloroethane at 30° C.
   (c) 5-30% of an impact modifier selected from the group consisting of butadiene and acrylate based rubber grafts which is characterized in having a glass transition temperature below 20° C., said percents being relative to the weight of said blend and 0.1 to 5.0 phr of a monomeric or an oligomeric ester plasticizer which is derived from a trimellitic acid and a $C_1$-$C_{20}$ aliphatic or araliphatic alcohol characterized in that its number average molecular weight is at most 5,000, said phr being in relation to the weight of the blend.

* * * * *